| United States Patent [19] | [11] Patent Number: 4,853,129 |
| Wan | [45] Date of Patent: Aug. 1, 1989 |

[54] MODIFIED REGENERATED CELLULOSE MEMBRANE FOR NON-AQUEOUS SEPARATIONS

[75] Inventor: Wankei Wan, Sarnia, Canada

[73] Assignee: Exxon Research & Engineering Company, Florham Park, N.J.

[21] Appl. No.: 50,771

[22] Filed: May 18, 1987

Related U.S. Application Data

[63] Continuation of Ser. No. 561,286, Dec. 14, 1983, abandoned.

[51] Int. Cl.$^4$ .............................................. B01D 13/00
[52] U.S. Cl. ..................................... 210/651; 210/655; 210/500.29
[58] Field of Search ..................... 210/655, 651, 500.29

[56] References Cited

U.S. PATENT DOCUMENTS

| 3,140,256 | 7/1964  | Martin et al.    | 210/508 X     |
| 3,276,996 | 10/1966 | Laare            | 210/654       |
| 3,620,970 | 11/1971 | Klug et al.      | 210/500.29 X  |
| 3,864,289 | 2/1975  | Rendall          | 210/500.29 X  |
| 4,368,112 | 1/1983  | Thompson et al.  | 210/500.29 X  |

*Primary Examiner*—Frank Spear
*Attorney, Agent, or Firm*—Joseph J. Allocca

[57] ABSTRACT

Regenerated cellulose membranes used for the separation of organic liquids, for example, ketone dewaxing solvents from dewaxed oil or NMP extraction solvents from extract, have their solute rejection capability enhanced by chemical modification by contacting said membrane with a bifunctional reagent that is reactive with the hydroxy groups in the anhydroglucose units of the regenerated cellulose polymer. The reaction of the bifunctional reagent with the hydroxy groups in the polymer results in the crosslinking of the polymer which, in turn, results in the improvement of the membrane's selectivity in organic liquid separations applications.

13 Claims, No Drawings

MODIFIED REGENERATED CELLULOSE MEMBRANE FOR NON-AQUEOUS SEPARATIONS

This is a continuation of U.S. Ser. No. 561,286, now abandoned.

DESCRIPTION OF THE INVENTION

Regenerated cellulose (RC) membranes can be converted into a form useful for separating organic liquids, (for example, ketone dewaxing solvents from dewaxed oil or extraction solvents from extract oils) and having enhanced solute rejection through chemical modificaation. Said RC membrane is contacted with a bifunctional reagent that reacts with the hydroxy groups in the anhydroglucose units of the regenerated cellulose polymer. This reaction produces a crosslinked polymer membrane. This crosslinking results in the improvement of the membrane's selectivity in organic liquid separations applications. Further, the crosslinking reaction also serves to reduce the hydrophilicity of the RC membranes. Thus, by use of crosslinking agents which do not leave any unreacted hydroxy groups after the completion of the crosslinking procedure, nor introduce any hydroxy groups of their own (e.g. sulfones), RC membranes are rendered useable in ketone/oil separation processes, even in the presence of water in the feed (i.e., nonaqueous, but water wet streams may be separated without detriment to membrane performance).

A solution of the crosslinking, bifunctional reagent in a suitable solvent is reacted with the regenerated cellulose. The concentration of the bifunctional reagent is about 5–30%, preferably about 10–20% by weight (based on total solution). The crosslinking reaction is carried out at a temperature in the range of about 20°–110° C. for from about 30 to 300 minutes.

BACKGROUND OF THE INVENTION

The use of crosslinking reactions for membrane modification to impart desirable properties on the membrane has been the subject of numerous inventions.

In U.S. Pat. No. 3,232,916 a method for crosslinking poly(vinyl-alcohol) membranes by heat treating is described. The crosslinked membranes are useful as partitions in batteries and electrolytic cells.

U.S. Pat. No. 3,265,536 describes crosslinking poly(vinyl-alcohol) using formaldehyde. The resulting membrane is useful in fuel cell applications.

Aromatic polyamide membranes were cross linked by chemical reaction with aldehydes, polyamines, peroxides, or by irradiation. The resulting membranes were described in U.S. Pat. No. 3,904,519 as having improved flux stability.

U.S. Pat. No. 3,951,621 teaches that a nylonpoly(vinyl-alcohol) membrane was crosslinked by incorporating dicarboxylic acids into the casting dope and subsequent heat treatment. These membranes, after saturation with 6M silver nitrate solution, gave good paraffin/olefin separations.

U.S. Pat. No. 4,020,142 describes a method for improving the compaction resistance of a polybenzimidazole membrane by crosslinking the membrane with strong polybasic acids.

The water-salt separation capability of polyamide and polyhydrazide membranes was improved by crosslinking the membranes with metal ions of the alkali earth metal, transition metal, aluminum or lead groups, as described in U.S. Pat. No. 4,086,215.

The use of plasma to effect membrane crosslinking was described in U.S. Pat. No. 4,046,843 and U.S. Pat. No. 4,163,725. The resulting membranes were described as having good separation characteristics in water-salt separations.

See also U.S. Pat. No. 3,140,256; U.S. Pat. No. 3,864,289; U.S. Pat. No. 3,585,126; U.S. Pat. No. 3,669,954; U.S. Pat. No. 3,837,900; U.S. Pat. No. 4,186,238; U.S. Pat. No. 4,194,024; U.S. Pat. No. 4,200,558; U.S. Pat. No. 4,175,183; Japanese patent application No. 038137.

U.S. Pat. No. 3,556,991 describes a method for the recovery of aromatic hydrocarbons using the steps of solvent extraction, dialysis and fractionation of the extract. In the dialysis all the extracted aromatic component is separated from the extraction solvent by dialysis of the aromatic component through the membrane. Examples of suitable membrane materials are listed at column 4, line 16ff of the patent and include cellulose esters, cellulose ethers, blends of cellulose esters and cellulose ethers and other cellulose derivatives. Other suitable membranes include films of 2-chlorobutadiene, polyethylene, polypropylene, polytetrafluoroethylene, copolymers of butadiene and styrene, copolymers of isoprene and isobutylene, vinyl chloride, vinylidene chloride, crosslinked copolymers of ethylene and propylene, vulcanized natural rubber and the like. This process may also employ cellulose ester, ether and other cellulose derivative membranes modified by reacting the free hydroxyl groups of such members with organic reagents such as aldehydes, aldehyde-alcohol mixtures, organic dissocyanates, organic monoisocyanates, etc., or by aldehyde followed by an organic diisocyanate.

In all cases cited, the crosslinking reaction was used to impact beneficial properties to the membrane, e.g., compact resistance, salt rejection. It is to be noted that nowhere in the literature was there mentioned the use of crosslinking reactions to reduce RC membrane hydrophilicity and improve RC membrane separation efficiency in the separation of organic liquids.

The reaction of crosslinking chemicals with the hydroxy groups present in the anhydroglucose units of cellulose has been investigated quite extensively, especially in the field of textile finishing (see for example Kirk-Othmer's Encyclopedia of Chemical Technology, Vol. 22, 3rd Edition, p. 770–790, 1983 Wiley N.Y.). However, such reactions have not been investigated for use to improve the performance as well as to reduce the hydrophilicity of RC membranes for use in non-aqueous separations.

THE PRESENT INVENTION

Crosslinked regenerated cellulose membranes of enhanced solute rejection are described. A process is described for modifying the structure of regenerated cellulose thereby rendering such membranes useable in organic liquid separation processes. The process of the present invention imparts organic liquid separation capability to regenerated cellulose and is especially useful and finds particular application in the recovery of ketone dewaxing solvents from dewaxed oil and in the recovery of extraction solvents such as NMP, phenol, furfural, N,N-dimethyl formamide (DMF), dimethyl sulfoxide (DMSO) or dimethyl acetamide (DMAC) from extract oils. Regenerated cellulose prepared by any of the techniques common to the art may be modified by the present process.

Regenerated cellulose is a class of well-known polymer formed by the precipitation of cellulose from its solution, see Kirk-Othmer Encyclopedia of Chemical Technology, Third Edition, Vol. 5, pg. 70–163, J. Wiley & Sons 1979 for general background. Regenerated cellulose prepared as cellophane (via the viscose process from cellulose xanthate) cuprophane (via coprammonium process) or cuenophane (via the cuene process) are likely candidates for modification by the present technique.

The regenerated cellulose membrane which can be modified by the procedure described herein may be in any convenient form, e.g., sheets, tubes, hollow fibers, etc, irrespective of thickness or molecular weight cutoff.

The regenerated cellulose membranes typically have a thickness in the range 10 to 50 $\mu m$, more usually 10 to 20 $\mu m$.

A regenerated cellulose membrane is characterized in terms of molecular weight cut off (which is related to its pore size). Pore size as such cannot be categorically stated for semi permeable membranes, such as regenerated cellulose, for many reasons. For example, pore sizes change with temperature and depend on the solvent saturated within the membrane matrix which may swell or shrink the membrane.

Regenerated cellulose membranes are generally made in a molecular weight cut off (MWCO) range of from about 3000 to 300,000 correspoinding to pore diameters of about 10 Å to about 300 Å+, when using proteins in water as the sizing system to characterize them. It must be noted that many organic solvents, such as NMP, ketone, etc. interact with regenerated cellulose membranes causing a change in the pore diameter. As used in this application the MWCO recited for membranes reflects the pore diameter of the starting membrane (sized using water protein systems).

In using the crosslinked regenerated cellulose membranes of the present invention in the nonaqueous separations recited, the membranes can be conveniently used in any of the typical configurations now employed in the art. Regenerated cellulose membranes are manufactured in the form of sheets, tubes, fibers, etc. Tubes and fibers can be employed in the form of modules such as those described in U.S. Pat. No. 3,228,877. Membranes in sheet form can be fabricated into spiral wound membrane elements as embodied, for example, in U.S. Pat. No. 3,417,870, U.S. Pat. No. 3,173,867, U.S. Pat. No. 3,367,504, U.S. Pat. No. 3,386,583, and U.S. Pat. No. 3,397,790.

In fabricating spiral wound elements for use in different feed stream environments, care must be exercised in selecting the proper adhesive system for element fabrication in light of the feed stream to be encountered.

When the spiral wound regenerated cellulose element is to be employed to separate ketone dewaxing solvent from dewaxed oil, the spiral wound element can comprise layers of regenerated cellulose wound around a metal central tube containing holes for the permeate, the membrane layers being separated by alternate layers of a permeate carrier, e.g., knitted Simplex (Dacron with melamine formaldehyde stiffener), and a feed spacer, e.g., Vexar (a polypropylene mesh). Membrane layers are sealed along the edges using an epoxy adhesive to sandwich the permeate carrier into a closed envelope in fluid communication with the perforated central tube, leaving the perforations in the central tube as the only permeate outlet. The epoxy adhesive comprises a ketone resistant resin formulation comprising (1) Epron 828 which is a reaction product of bisphenol-A and epichlorolydrin, (2) Cabosil M5, (3) Versamed 140 (a polyamide curing agent), (4) Estane 5707F-1 (a poly urethane from B. F. Goodrich) and (5) DMF solvent, wherein the components 1/2/3/4/5 are present in a relationship based on parts by weight of about 100/10/60/4/12, which cures at about 25° C. over about a 21 day period. This epoxy adhesive system is described and claimed in U.S. Ser. No. 494,409, filed May 13, 1983. The layers of membrane, permeate carrier and feed spacer are would around the central tube in a fashion consistent with preparing a spiral wound element. After the element is cured, the ends of the element are trimmed; a nylon seal carrier and a nylon anti-telescoping device are then added. The element is then covered on the outside with an epoxy reinforced fiberglass outer wrap.

Similarly, when fabricating a spiral wound element for use in an NMP/oil environment, similar care must be taken in selection of the materials used. In such an element for use in NMP the materials used in fabrication differ from the bove in the following way: the permeate spacer used is a material identified as Hornwood Style 8415, (nylon mesh with NMP resistant sizing) and the adhesives are specific silicon/primer systems. A silicon/primer system which may be used to bond the membrane to the central tube, to form the membrane edge seals and to form the element outer wrap is preferably a two component condensation type red polysiloxane adhesive such as General Electric (GE) RTV silicon 31 in combination with a catalyst such as GE 9811 or dibutyl tin dilaurate (DBT). The surfaces to be bonded are primed used a polysiloxane in solvent primer such as GE SS-4044. The silicon and GE-9811 catalyst are preferably used in a ratio of 19/1 and the primer is preferably diluted with isopropylalcohol at a dilution of up to 4 to 1. The DBT catalyst (a liquid catalyst) is preferably employed at a concentration of 0.10% to give an adequate pot life. The primed surfaces are permitted to dry prior to application of the adhesive catalyst mixture so as to avoid adhesive cure inhibition.

These silicon/primer systems are described and claimed in copending application U.S. Ser. No. 561,477, filed even date herewith in the names of W. M. King and H. F. Shuey now U.S. Pat. No. 4,582,726.

Regenerated cellulose membrane (in whatever form desired) are chemically modified by reacting the membrane with a bifunctional reagent through the hydroxy groups in the anhydro glucose units of the regenerated cellulose polymer. Crosslinking of the membrane structure is achieved by the reaction of the bifunctional reagents with the hydroxy groups of different polymer chains within, and making up, the polymeric membrane. Crosslinked regenerated cellulose membranes prepared by the present process are more selective for organic liquid separations. Crosslinking can be effected either before or after the membrane material has been fabricated into the desired mechanical element form (i.e. spiral wound membrane, bundled fibers etc), that is, crosslinking can be accomplished in situ.

In general, any potential bifunctional reagent that will react with hydroxyl groups can be used as the crosslinking agent. Representative but non limiting examples of such bifunctional reagents include: Bis(2-hydroxy ethyl)sulfone, dimethyldichloro-silane, epichlorohydrin, formaldehyde, dimethylolurea, dimethylol ethylene urea, diisocyanates.

The bifunctional reagent is used in solution of a concentration of about 5-30% by wt, preferably 10-20% by weight of the solution. Any non reactive solvent may be used as the diluent for the bifunctional reagent so long as the solvent does not interfere with the reagent/membrane section. Examples of suitable solvents include aliphatic hydrocarbons, aromatic hydrocarbons, chlorinated hydrocarbons, ketones, dipolar aprotic solvents, such as DMF, DMSO, DMAc, NMP, etc. Solvent boiling point should be below the temperature at which the crosslinking is carried out.

Crosslinking may be conducted at from about 20°-110° C. Reaction time will depend on the end use of the reacted membrane. In general times on the order of 30 to 300 minutes may be used with times on the order of about 30-180 minutes being typical. Clearly, at any given temperature, longer reaction times will result in denser, more extensive crosslinking of the membrane. The increase in the degree of crosslinking is evidenced by an increase in membrane rejection (i.e. increased selectivity) of a given solute/solvent system (and an accompanying decrease in flux). Excessive crosslinking can result in a substantial loss of flux and may even render the membrane fragile or brittle.

Chemically modified regenerated cellulose membranes by the crosslinking process of the present invention find specific application for the separation of ketone dewaxing solvents from dewaxed oil. U.S. Ser. No. 263,307 teaches the separation of ketone from oil using regenerated cellulose which has been converted from hydrophilic to hydrophobic form by the permeation, under pressure, of a series of solvents of decreasing polarity through the water containing membrane starting with a low molecular weight alcohol followed by a solvent or series of solvents or bulk liquid-liquid miscibility with the solvents immediately preceeding and immediately following said solvent and ending with a solvent which exhibits bulk liquid-liquid miscibility with the organic liquid (i.e., ketone) to be permeated (see also U.S. Ser. No. 263,116 and European patent application, publication No. 13,834). This is to be compared with the process of the present inventions wherein ketone can be separated from oil using a regenerated cellulose membrane which has been crosslinked. Pressure permeation of solvents is not required. If the regenerated cellulose membrane is received softened in glycerol, it is soaked in water to remove the glycerol. The water containing membrane then needs merely to be soaked in solvents such as methanol then methyl ethyl ketone (or just acetone) to displace the free water (not hydrogen bonded water which is removed during the crosslinking step), prior to crosslinking. The crosslinked regenerated cellulose membrane, after rinsing to remove excess reagent can be used without further processing.

The regenerated cellulose membrane chemically modified by the crosslinking process of the present invention also finds specific application for the separation of extraction solvents such as NMP or phenol, furfural, N,N-dimethyl formamide (DMF), dimethylsulfoxide (DMSO) or dimethylacetamide (DMAC) from extracted oil extract. The basic ability of regenerated cellulose in the uncrosslinked-unmodified form to effect such a separation is disclosed and claimed in copending application U.S. Ser. No. 561,169, filed even date herewith in the name of John A. Thompson now U.S. Pat. No. 4,510,047.

The present invention is demonstrated by reference to the following nonlimiting examples.

EXAMPLE 1

A regenerated cellulose membrane, 17.5 μm thick having a MWCO of about 10,000 to 12,000, was water washed, soaked in methanol for about 10-15 minutes, soaked in acetone/MEK for about 10-15 minutes, and then put in a crosslinking solution consisting of a 10 wt.% solution of epichlorohydrin and 10 wt.% triethylamine in methyl ethyl ketone solvent at 25° C. for 1 hour. The membrane was then rinsed in methyl ethyl ketone/acetone to remove excess reaction solution, then soaked in MEK/acetone for about 10-15 minutes and stored in MEK. No other preconditioning was employed on this crosslinked membrane sample. This membrane was tested for ketone-oil separation capacity and compared against a regenerated cellulose membrane which was not crosslinked, but which had been pretreated in accordance with the procedure of U.S. Ser. No. 263,116. The results are presented below.

|  | Sample # (I) | |
| --- | --- | --- |
|  | 1 | 2 (II) |
| Feed Oil % (III) | 24.4 (a) | 22.7 (b) |
| Flux: $l/m^2$-d | 190 | 400 |
| Rejection % (IV) | 81 | 55 |

(I) Test conditions:
Pressure 2750 kPa (400 psi)
Temperature ambient (about 23° C.)
(II) Regenerated cellulose, not crosslinked, preconditioned by permeating methanol, then MEK for 1 hour each at 400 psi and ambient temperature (~23° C.)
(III) Feed solution:
(a) 150 N dewaxed oil in 60/40 MIBK/MEK
(b) 150 N dewaxed oil in 50/50 MEK/MIBK
(IV) Rejection % is defined as $R\% = \frac{[Oil]\ feed - [oil]\ permeate}{[oil]\ feed} \times 100$ From this it is seen that RC membrane selectivity in ketone-oil separation can be increased significantly by this crosslinking reaction.

EXAMPLE 2

A regenerated cellulose membrane 10 μm in thickness, about 10,000 to 12,000 MWCO, available from Enka as PM 100 was water washed and then reacted with bis(hydroxyethyl)sulfone for 3 hours at 90° C., the reaction being carried out in an aqueous 20 wt.% solution to give sample #3. The reacted membrane was then water rinsed, soaked in methanol for about 10-15 min., the permeate with MEK at 400 psi at ambient temperature (about 27° C.). The membrane was tested for ketone-oil separation under the same conditions as used in Example 1 to give the following results:

|  | Sample # | | |
| --- | --- | --- | --- |
|  | 3 | 4(3) | 5(3) |
| Feed Oil %(1) | 24.0 | 22.7 | 22.7 |
| Water % | 1 | 0 | 1 |
| Flux ($l/m^2$ day) | 297 | 400 | (2) |
| Rejection % | 78 | 55 | (2) |

(1)Feed solution as defined in Example 1 but contains 1% of water where indicated.
(2)No permeation observed.
(3)Same as Sample #2, previous Example This example shows that not only can significant increase in membrane selectively for ketone-oil separation be achieved by this reaction but also that the hydrophilic character of the crosslinked membrane is greatly reduced so that its performance is not affected by the presence of waater in the feed.

EXAMPLE 3

A regenerated cellulose membrane 10 μm thick, about 10,000 to 12,000 MWCO, available from ENKA AG as PM 100 was reacted in a toluene solution consisting of 10 wt.% epichlorohydrin and 20 wt.% triethylamine at 90° C. for 1 hour. The reacted membrane was then washed in toluene and stored in toluene. After being rinsed in NMP it was tested for NMP-Oil separation (basic NMP-oil separation process using uncrosslinked regenerated cellulose disclosed and claimed in copending application U.S. Ser. No. 561,169 filed even date herewith in the name of John A. Thompson) to give the following results:

|  | Sample #[1] | |
|---|---|---|
|  | 6 | 7[2] |
| Feed Oil % | 20.5 | 21 |
| Flux l/m² day | 152 | 718 |
| Rejection % | 90 | 55 |

[1]Experimental conditions:
Temperature 110° C.
Pressure ~3450 Kpa (500 psi)
[2]Unmodified regenerated cellulose membrane.

From this it is seen that crosslinking regenerated cellulose benefits the NMP-oil separation process by increasing selectivity.

EXAMPLE 4

The same regenerated cellulose membrane as used in Example 3 was reacted with epichlorohydrin under conditions similar to that used in Example 3 except the reaction temperature was varied between 60°-90° C. after being rinsed in NMP. The resulting membranes were tested for NMP-Oil separation at 110° C., 3450 Kpa (500 psi) as in Example 3 to give the following results:

|  | Sample # | | | |
|---|---|---|---|---|
|  | 8 | 9 | 10 | 11[1] |
| Feed Oil % | 18.5 | 19.0 | 20.5 | 21.0 |
| Crosslinking temperature °C. | 60 | 80 | 90 | — |
| Flux l/m² day | 480 | 218 | 152 | 718 |
| Rejection % | 68 | 74 | 90 | 55 |

[1]Unreacted regenerated cellulose membrane.

EXAMPLE 5

A regenerated cellulose membrane as used in Example 3 was reacted with epichlorohydrin under conditions similar to that used in Example 3 except that the reaction times of 30 minutes and 60 minutes were used at a reaction temperature of 70° C. The resulting membranes were tested for NMP-oil separation under conditions as in Example 3 to give the following results:

|  | Sample # | |
|---|---|---|
|  | 12 | 13 |
| Feed Oil % | 22 | 21 |
| Temperature, °C. | 70 | 70 |
| Crosslinking Time (minutes) | 30 | 60 |
| Flux l/m²-day | 335 | 295 |

-continued

|  | Sample # | |
|---|---|---|
|  | 12 | 13 |
| Rejection % | 73 | 81 |

Examples 4 and 5 show that membrane rejection performance can be adjusted by varying the crosslinking reaction conditions (i.e. time and temperature).

What is claimed is:

1. A method for separating nonaqueous mixtures by permeation through a selection separation membrane wherein the selective separation membrane is regenerated cellulose which has been chemically modified by the step consisting essentially of contacting said membrane with a bifunctional reagent which reacts with the hydroxy groups in the anhydroglucose units of the regenerated cellulose.

2. The method of claim 1 wherein the bifunctional reagent is reacted with the regenerated cellulose in the form of a solution containing 5-30 weight percent bifunctional reagent and the contacting is for from about 30-300 minutes at from about 20°-110° C.

3. The method of claim 1 wherein the nonaqueous mixtures which are separated by permeation through the chemically modified regenerated cellulose membranes are mixtures of ketone dewaxing solvent and oil, mixtures of n-methyl pyrrolidone (NMP) extraction solvent and oil and mixtures of phenol extraction solvent and oil.

4. The method of claim 3 wherein the oils are petroleum oils.

5. The method of claim 4 wherein the oils are lubricating and transformer oils.

6. The method of claim 1 wherein the bifunctional reagent is selected from the group bis(2-hydroxy ethyl)-sulfone, dimethylchlorosilane, epichlorohydrin formaldehyde, dimethylurea, dimethyl ethylene urea, diisocyanates.

7. The method of claim 1 wherein the regenerated cellulose membrane prior to being contacted with the bifunctional reagent is soaked in water to remove glycerol therefrom, followed by soaking in alcohol followed by soaking in ketone to displace free water therein.

8. The method of claim 7 wherein the alcohol is methanol and the ketone is methyl ethylketone or acetone.

9. The method of claim 7 wherein the alcohol is methanol and the ketone is methyl ethyl ketone or acetone.

10. A method for separating nonaqueous, water wet mixtures by permeation through a selective separation membrane wherein the selective separation membrane is regenerated cellulose which has been chemically modified by the step consisting essentially of contacting said memrane with a bifunctional reagent which reacts with the hydroxy groups in the anhydroglucose units of the regenerated cellulose but which bifunctional reagent, after reaction, has no residual unreacted hydroxy groups of its own.

11. The method of claim 10 wherein the bifunctional reagent used is bis(2-hydroxy ethyl)sulfone.

12. The method of claim 11 wherein the bifunctional reagent is reacted with the regenerated cellulose in the form of a solution containing 5-30 weight percent reagent and the contacting is for from 30-300 minutes at from about 20°-110° C.

13. The method of claim 10 wherein the regenerated cellulose membrane prior to being contacted with the bifunctional reagent is soaked in water to remove glycerol therefrom followed by soaking in alcohol followed by soaking in ketone to displace free water therein.

* * * * *